US010627582B2

(12) United States Patent
Shimakawa et al.

(10) Patent No.: US 10,627,582 B2
(45) Date of Patent: Apr. 21, 2020

(54) OPTICAL CONNECTION COMPONENT AND METHOD OF MANUFACTURING OPTICAL CONNECTION COMPONENT

(71) Applicant: SUMITOMO ELECTRIC INDUSTRIES, LTD., Osaka-shi, Osaka (JP)

(72) Inventors: Osamu Shimakawa, Osaka (JP); Hidehisa Tazawa, Osaka (JP); Ryoichi Kobayashi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/386,657

(22) Filed: Apr. 17, 2019

(65) Prior Publication Data

US 2019/0331861 A1 Oct. 31, 2019

(30) Foreign Application Priority Data

Apr. 25, 2018 (JP) ................................. 2018-084125

(51) Int. Cl.
*G02B 6/38* (2006.01)
*G02B 6/245* (2006.01)
*G02B 6/40* (2006.01)

(52) U.S. Cl.
CPC ........... *G02B 6/3861* (2013.01); *G02B 6/245* (2013.01)

(58) Field of Classification Search
CPC ...... G02B 6/3861; G02B 6/245; G02B 6/403; G02B 6/3672; G02B 6/3562
See application file for complete search history.

(56) References Cited

U.S. PATENT DOCUMENTS

| 7,419,308 | B2 * | 9/2008 | Ma | G02B 6/25 |
| | | | | 385/115 |
| 9,703,035 | B2 * | 7/2017 | Imoto | C03B 19/00 |
| 2015/0043871 | A1 * | 2/2015 | Mitose | G02B 6/3885 |
| | | | | 385/76 |

FOREIGN PATENT DOCUMENTS

JP 2017-181791 A 10/2017

* cited by examiner

*Primary Examiner* — Ryan A Lepisto
(74) *Attorney, Agent, or Firm* — Faegre Drinker Biddle & Reath LLP

(57) ABSTRACT

An optical connection component comprising optical fibers, a ferrule and a tube, is disclosed. The optical fibers are provided with coating removal portions and coated fiber portions. The coating removal portions includes first fiber portions held by a first inner hole of the ferrule and second fiber portions positioned between the first fiber portions and the coated fiber portions. The tube places, in a second inner hole, a part of the ferrule, the first fiber portions held by the part of the ferrule, the second fiber portions, and a part of the coated fiber portions adjacent to the second fiber portions. The first fiber portions are fixed onto an inner circumferential surface of the first inner hole with an adhesive agent, and a region, in which the second fiber portions are placed in the second inner hole, is not filled with an adhesive agent, and a void is provided there.

20 Claims, 6 Drawing Sheets

OPTICAL CONNECTION COMPONENT AND METHOD OF MANUFACTURING OPTICAL CONNECTION COMPONENT

CROSS REFERENCE

This application is based on and claims benefits of priority to Japanese Patent Application No. 2018-084125, filed on Apr. 25, 2018, the contents of which are incorporated by reference herein in its entirety.

TECHNICAL FIELD

The present disclosure relates to an optical connection component and a method of manufacturing an optical connection component.

BACKGROUND

Japanese Unexamined Patent Publication No. JP2017-181791A discloses an optical connection component including a fiber bundle. This optical connection component includes a plurality of optical fibers and a ferrule holding the plurality of optical fibers. The plurality of optical fibers are provided with glass fiber portions which are not coated with plastic and plastic coating portions which are coated with plastic. The glass fiber portions are inserted into the hole of the ferrule, and fixed into the hole of the ferrule with an adhesive agent, which fills the hole of the ferrule. The rear end parts of the glass fiber portions are arranged outside the hole rearward of the ferrule. A containing component is provided in the rear of the ferrule, and the containing component has a hole that places the rear end parts and the plastic coating portions therein. The hole of the containing component is filled with an adhesive agent, and the rear end parts and the plastic coating portions are fixed into the hole of the containing component with the adhesive agent.

SUMMARY

The present disclosure provides an optical connection component which comprises a plurality of optical fibers, a ferrule, and a tube. Each of the optical fibers has a bare optical fiber and a plastic coating that surrounds the bare optical fiber. The plurality of optical fibers are provided with coating removal portions in which the plastic coatings are removed from respective tips of the plurality of optical fibers so as to expose the bare optical fibers, and coated fiber portions in which the plastic coatings respectively surround the bare optical fibers. The coating removal portions and the coated fiber portions are sequentially placed along an axial direction of the optical connection component from the tips. The ferrule has a first inner hole extending from a first end adjacent to the tips to a second end opposite to the first end. The ferrule holds tip parts of the coating removal portions in the first inner hole. The tube has a second inner hole larger in inner diameter than the first inner hole. The tube is configured to protect the coating removal portions placed within the second inner hole. The coating removal portions includes first fiber portions held by the first inner hole of the ferrule and second fiber portions positioned between the first fiber portions and the coated fiber portions along the axial direction. The tube places, in the second inner hole, a part of the ferrule closer to the second end, the first fiber portions held by the part of the ferrule, the second fiber portions, and a part of the coated fiber portions adjacent to the second fiber portions. The first fiber portions are fixed onto an inner circumferential surface of the first inner hole with a first adhesive agent, and a region, in which the second fiber portions are placed in the second inner hole, is not filled with an adhesive agent, and a void is provided between the second fiber portions and an inner circumferential surface of the second inner hole.

The present disclosure further provides a method of manufacturing an optical connection component. The manufacturing method comprises: preparing a plurality of optical fibers each having an bare optical fiber and a plastic coating that surrounds the bare optical fiber; preparing a ferrule having a first inner hole extending from a first end to a second end; preparing a tube having a second inner hole extending from a first end to a second end, the second inner hole being larger in inner diameter than the first inner hole; removing tip parts of the plastic coating portions of the plurality of optical fibers to provide coating removal portions in which the plastic coatings are removed from respective tips of the plurality of optical fibers so as to expose the bare optical fibers, and coated fiber portions in which the plastic coatings respectively surround the bare optical fibers; inserting the plurality of optical fibers into the first inner hole of the ferrule such that first fiber portions of the coating removal portions near the tips is placed in the first inner hole, and bonding the first fiber portions to the first inner hole to produce a subassembly; and inserting the ferrule of the subassembly into the second inner hole from its tip to place, in the second inner hole, a part of the ferrule closer to the second end, the first fiber portions held by the part of the ferrule, second fiber portions, of the coating removal portions, communicating with the first fiber portions and positioned outside the ferrule, and a part of the coated fiber portions adjacent to the second fiber portions, wherein a region, in which the second fiber portions are placed in the second inner hole, is not filled with an adhesive agent, and a void is provided between the second fiber portions and an inner circumferential surface of the second inner hole.

BRIEF DESCRIPTION OF THE DRAWINGS

The foregoing and other purposes, aspects and advantages will be better understood from the following detailed description of a preferred embodiment of the disclosure with reference to the drawings, in which.

DETAILED DESCRIPTION

[Technical Problems Solved by Disclosure]

In the optical connection component disclosed in JP2017-181791A, while a gap between the hole of the ferrule and the glass fiber portions is set to be small, a gap between the hole of the containing component and the glass fiber portions tends to be relatively large. When such a hole of the containing component is filled with an adhesive agent, the volume of the adhesive agent tends to be relatively large in the hole of the containing component. Accordingly, a volume change of the adhesive agent, such as thermal expansion and shrinkage, hygroscopic swelling, or the like, due to an environmental change such as a temperature change or a humidity change tends to be large. When such a volume change occurs in the state where the hole of the containing component is filled with the adhesive agent, stress occurring according to the volume change of the adhesive agent can be directly loaded to a portion in contact with the adhesive agent, such as the glass fiber portions and the inner circumferential surface of the hole of the containing component. If such stress is loaded to the glass fiber portions low in mechanical strength, the glass fiber portions largely deform, and there is a concern that this results in occurrence of deterioration of optical transmission characteristics due to optical fiber micro-bending or breakage. As a result, such component can impair reliability of the optical fibers.

[Advantageous Effects of Disclosure]

According to the optical connection component and the manufacturing method of an optical connection component of the present disclosure, stress on optical fibers is reduced and thereby reliability of the optical fibers can be enhanced.

[Description of Embodiments of Disclosure]

First, the contents of embodiments of the present disclosure are listed and described. An optical connection component according to one embodiment of the present disclosure comprises a plurality of optical fibers, a ferrule, and a tube. Each of the optical fibers has a bare optical fiber and a plastic coating that surrounds the bare optical fiber. The plurality of optical fibers are provided with coating removal portions in which the plastic coatings are removed from respective tips of the plurality of optical fibers so as to expose the bare optical fibers, and coated fiber portions in which the plastic coatings respectively surround the bare optical fibers. The coating removal portions and the coated fiber portions are sequentially placed along an axial direction of the optical connection component from the tips. The ferrule has a first inner hole extending from a first end adjacent to the tips to a second end opposite to the first end. The ferrule holds tip parts of the coating removal portions in the first inner hole. The tube has a second inner hole larger in inner diameter than the first inner hole. The tube is configured to protect the coating removal portions placed within the second inner hole. The coating removal portions includes first fiber portions held by the first inner hole of the ferrule and second fiber portions positioned between the first fiber portions and the coated fiber portions along the axial direction. The tube places, in the second inner hole, a part of the ferrule closer to the second end, the first fiber portions held by the part of the ferrule, the second fiber portions, and a part of the coated fiber portions adjacent to the second fiber portions. The first fiber portions are fixed onto an inner circumferential surface of the first inner hole with a first adhesive agent, and a region, in which the second fiber portions are placed in the second inner hole, is not filled with an adhesive agent, and a void is provided between the second fiber portions and an inner circumferential surface of the second inner hole.

A method of manufacturing an optical connection component according to one embodiment of the present disclosure comprises: preparing a plurality of optical fibers each having an bare optical fiber and a plastic coating that surrounds the bare optical fiber; preparing a ferrule having a first inner hole extending from a first end to a second end; preparing a tube having a second inner hole extending from a first end to a second end, the second inner hole being larger in inner diameter than the ferrule in outer diameter; removing tip parts of the plastic coatings of the plurality of optical fibers to provide coating removal portions in which the plastic coatings are removed from respective tips of the plurality of optical fibers so as to expose the bare optical fibers, and coated fiber portions in which the plastic coatings respectively surround the bare optical fibers; inserting the plurality of optical fibers into the first inner hole of the ferrule such that first fiber portions of the coating removal portions near the tips is placed in the first inner hole, and bonding the first fiber portions to the first inner hole to produce a subassembly; and inserting the ferrule of the subassembly into the second inner hole from its tip to place, in the second inner hole, a part of the ferrule closer to the second end, the first fiber portions held by the part of the ferrule, second fiber portions, of the coating removal portions, being in series with the first fiber portions and positioned outside the ferrule, and a part of the coated fiber portions adjacent to the second fiber portions, wherein a region, in which the second fiber portions are placed in the second inner hole, is not filled with an adhesive agent, and a void is provided between the second fiber portions and an inner circumferential surface of the second inner hole.

In the aforementioned optical connection component and manufacturing method of an optical connection component, since the inner diameter of the second inner hole of the tube is larger than the inner diameter of the first inner hole of the ferrule, a gap between the second inner hole and the second fiber portions is larger than a gap between the first inner hole and the first fiber portions, and more adhesive agent can be placed in a region in which the second fiber portions are placed in the second inner hole. Nevertheless, in the aforementioned optical connection component and manufacturing method of an optical connection component, since the region in the second inner hole is not filled with an adhesive agent and a void is provided between the second fiber portions and the inner circumferential surface of the second inner hole, the volume of the adhesive agent inside the second inner hole can be reduced. Furthermore, by providing this void, a space with which a volume change of the adhesive agent is allowed in the second inner hole can be secured. Therefore, even when a large volume change occurs in the adhesive agent, large stress occurring due to the volume change can be buffered by a displacement of the adhesive agent. Thereby, stress on the second fiber portions due to the volume change of the adhesive agent can be reduced, and disadvantages such as occurrence of deterioration of optical transmission characteristics due to optical fiber micro-bending or breakage can be prevented. As a result, the above embodiment can enhance reliability of the optical connection component.

As one embodiment, the coated fiber portions may be fixed, with a second adhesive agent, onto the inner circumferential surface of the second inner hole around a second end, of the tube, opposite to a first end thereof on which the ferrule is held. Even when bending or tensile stress, or the like is exerted on the coated fiber portion, this embodiment can prevent such stress from being concentrated on the second fiber portions, from which the plastic coatings are removed.

As one embodiment, the second adhesive agent does not necessarily contact with the coating removal portions in the second inner hole. The second adhesive agent is prevented, as above, from being provided across the second fiber portions from the inner circumferential surface of the second inner hole along the edge of the coated fiber portions. Thereby, the configuration, in which the void is provided between the inner circumferential surface of the second inner hole and the second fiber portions, can be more securely realized. Furthermore, since the second adhesive agent does not contact with the coating removal portions, the coating removal portions and the plastic coatings are not fixed to each other with the second adhesive agent. In this case, since each bare optical fiber can slightly move inside the plastic coatings, even when stress is loaded to the second fiber portions exists, such stress can be buffered by a displacement of each bare optical fiber relative to the plastic coating. Thereby, this embodiment can further effectively reduce stress on the second fiber portions.

As one embodiment, a material of the first adhesive agent may be the same as a material of the second adhesive agent. When both of the adhesive agents are the same materials each other, the optical connection component can be easily manufactured.

As one embodiment, an outer circumferential surface of the ferrule around the second end thereof may be fixed onto the inner circumferential surface of the second inner hole around a first end, of the tube, closer to the tips with a third adhesive agent. Even when bending stress or the like is exerted on the coated fiber portions, this embodiment can prevent such stress from being concentrated on the second fiber portions.

As one embodiment, the first adhesive agent may be separate from the coated fiber portions in the second inner hole. This embodiment can prevent the first adhesive agent from being provided across the inner circumferential surface of the second inner hole from the second fiber portions along the edge of the coated fiber portions. Thus, it can be more securely realized that the void is provided between the inner circumferential surface of the second inner hole and the second fiber portions.

As one embodiment, the ferrule and the tube may be respectively composed of glass. In this case, ultraviolet (UV) curable resin can be used as the material of the adhesive agent, the adhesive agent can be cured by irradiating the adhesive agent with UV light through the glass. Thereby, the optical connection component can be easily manufactured. Furthermore, when the tube and the like are composed of glass, it can be easily confirmed that the second inner hole of the tube is not filled with the adhesive agent.

As one embodiment, the coefficient of linear expansion of the ferrule may be the same as the coefficient of liner expansion of the tube. Even when volume changes such as expansion or shrinkage occur in the ferrule and the tube due to a temperature change, the tube can be allowed to deform to meet the deformation of the ferrule in this embodiment. Thus, this embodiment can prevent the ferrule and the tube from being damaged due to the deformations by the temperature change.

As one embodiment, the first fiber portions may include small diameter portions with outer diameters made smaller than outer diameters of the second fiber portions. This embodiment can provide arrangement in high density of the tips of the optical fibers, and thereby can increase the number of optical fibers arranged in the component. As a result, optical network flexibility can be increased. In this embodiment, the outer diameters of the small diameter portions may be less than 55 percent of the outer diameters of the second fiber portions.

As one embodiment, the first inner hole may be provided with a taper extending from the second end toward the first end, and a straight extending from the taper toward the first end. An inner diameter of the taper gradually decreases towards the first end, and an inner diameter of the straight is constant. When the first fiber portions are inserted into the first inner hole of the ferrule in manufacturing of the optical connection component, this embodiment can guide the first fiber portions by the taper to be inserted into the straight. Thus, this embodiment can assist the first fiber portions to be inserted into the first hole easily or without damage on the fiber tips.

As one embodiment, tip end surfaces of the plurality of optical fibers may be flush with an end surface of the ferrule at the first end thereof. When the optical connection component of this embodiment is abutted against its counterpart connection component to connect it, the connection can be accurately performed.

As one embodiment, a first fiber filling rate of the first inner hole may be between 40% and 80%. The first fiber filling rate may be a ratio of a total sectional area of the plurality of optical fibers relative to a sectional area inside the first inner hole in a cross section passing through the first fiber portions out of cross sections perpendicular to the axial direction.

As one embodiment, a second fiber filling rate of the second inner hole may be less than 30%. The second fiber filling rate may be a ratio of a total sectional area of the plurality of optical fibers relative to a sectional area inside the second inner hole in a cross section passing through the second fiber portions out of cross sections perpendicular to the axial direction. The second fiber filling rate may be less than 15% or 20%. Since more adhesive agent can to be placed in the region in which the second fiber portions are placed in the second inner hole, the aforementioned effects can be suitably obtained.

As one embodiment, a second fiber filling rate of the tube may be smaller than a first fiber filling rate of the ferrule. The first fiber filling rate may be a ratio of a total sectional area of the plurality of optical fibers relative to a sectional area inside the first inner hole in a cross section passing through the first fiber portions out of cross sections perpendicular to the axial direction. The second fiber filling rate may be a ratio of a total sectional area of the plurality of optical fibers relative to a sectional area inside the second inner hole in a cross section passing through the second fiber portions out of cross sections perpendicular to the axial direction.

As one embodiment, respective lengths of the coating removal portions may be longer than a total length of the ferrule along the axial direction. Each of the ferrule and the tube may include a cylindrical member. As another embodiment, a number of the optical fibers may be between 10 and 40.

[Details of Embodiments of Disclosure]

Specific examples of an optical connection component and a method of manufacturing an optical connection component according to embodiments of the present disclosure are hereafter described with reference to the drawings. The present invention is not limited to these examples but intended to be indicated by the claims and to include all the modifications within the meaning and scope of equivalency of the claims. In the following description, the same elements in the description of the drawings are given the same signs, and their duplicate description is properly omitted.

Figure 1:
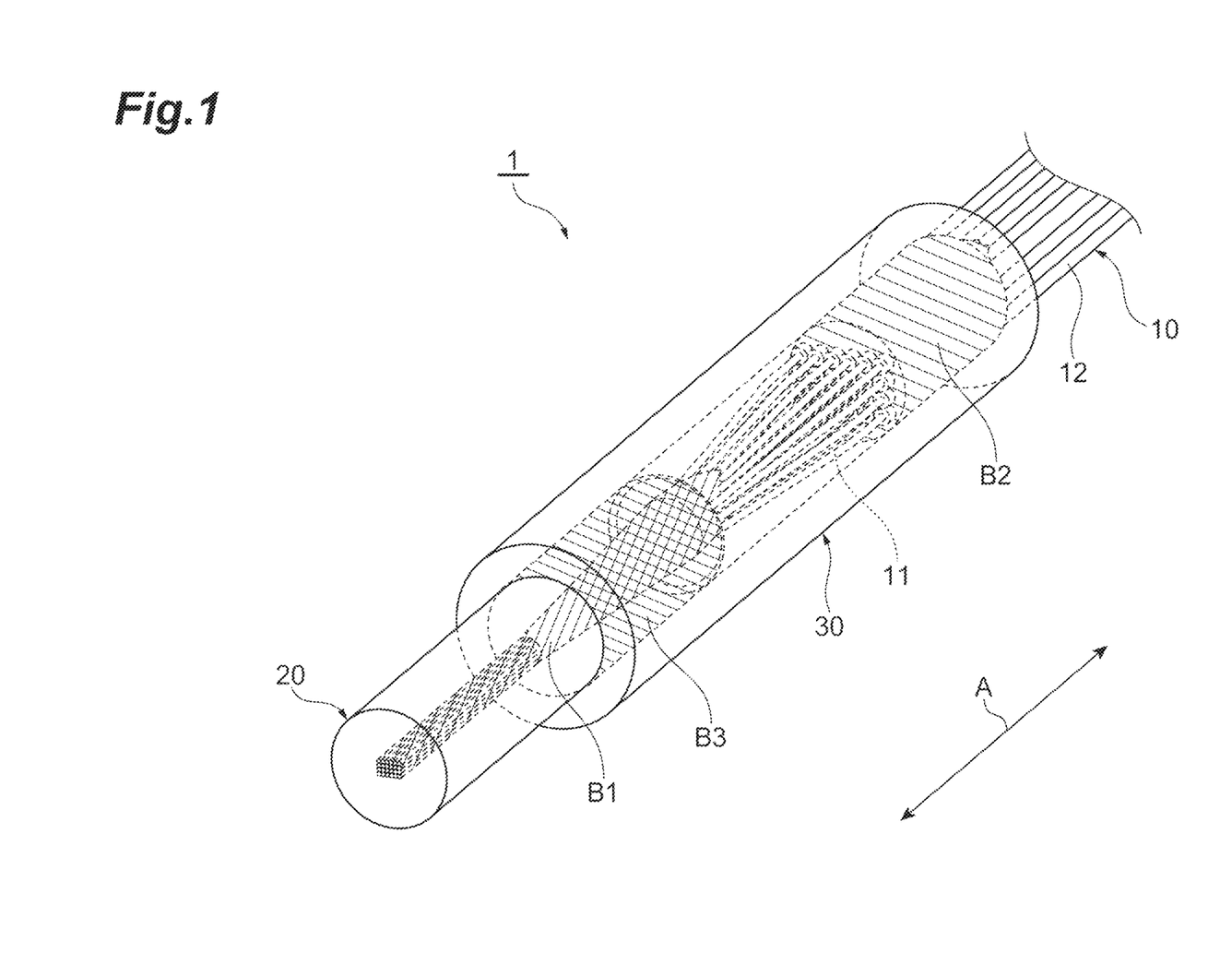
FIG. 1 is a perspective view showing an optical connection component according to an embodiment.
Figure 2:
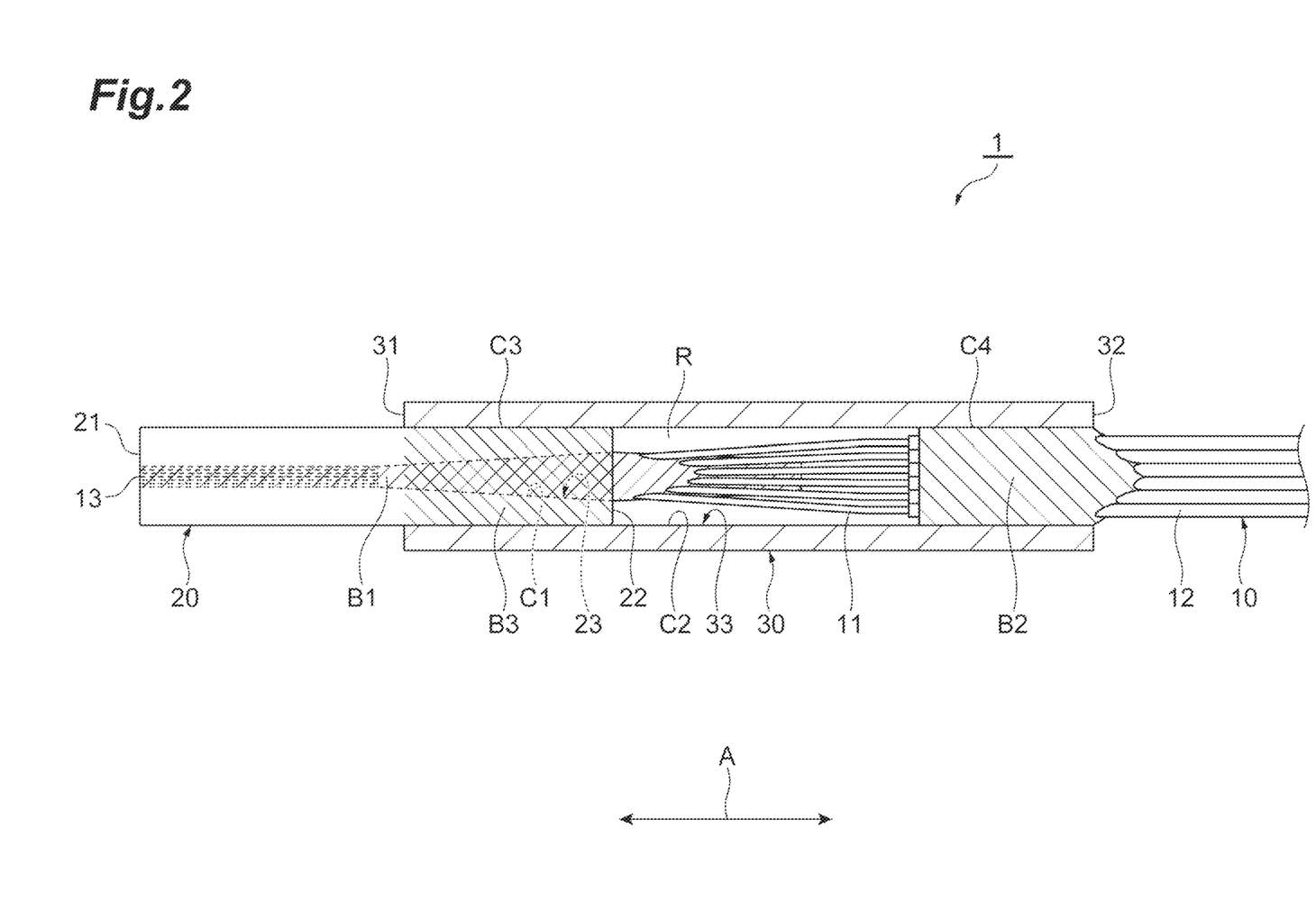
FIG. 2 is a lateral view including a partial cross section of the optical connection component shown in FIG. 1.

FIG. 1 is a perspective view showing an optical connection component 1 according to the present embodiment. FIG. 2 is a lateral view including a partial cross section of the optical connection component 1 shown in FIG. 1. As shown in FIG. 1 and FIG. 2, the optical connection component 1 includes a plurality of optical fibers 10, a ferrule 20, and a tube 30. In FIG. 2, the tube 30 is shown as a cross section taken along an axial direction A for ease of understanding. In the optical connection component 1, the plurality of optical fibers 10 are placed in the ferrule 20 in the state of being aggregated (bundled), and fixed (bonded) to the ferrule 20 with an adhesive agent B1. A connection portion of the plurality of optical fibers 10 and the ferrule 20 is placed in the tube 30. The optical fibers 10 are fixed to the tube 30 with an adhesive agent B2. The ferrule 20 is fixed to the tube 30 with an adhesive agent B3.

The optical connection component 1 is used, for example, as an optical transmission line of a 1×N (single input and N outputs; N is an integer) optical switch. The 1×N optical switch is applied, for example, to an optical communication system in which a plurality of spare optical transmission lines are prepared in advance. When malfunction occurs in an optical transmission line being used, the 1×N optical switch switches from the optical transmission line malfunctioning to any of the spare optical transmission lines. When the optical connection component 1 is used for the optical switch, cores of the optical fibers 10 are arranged and optically connected in such a way as to correspond to individual ports (for example, N output ports) of the optical switch. The optical connection component 1 may be used for connection to a multicore fiber. In this case, the cores of the optical fibers 10 are arranged and optically connected in such a way as to correspond to individual cores of the multicore fiber.

Each of the optical fibers 10 has an bare optical fiber 11 extending along the axial direction A of the optical connection component 1, and a plastic coating 12 that surrounds the bare optical fiber 11. Each of the bare optical fibers 11 is a single core fiber, for example, having a single core and a cladding that surrounds the core. The bare optical fibers 11 may be a multicore fiber having a plurality of cores. The number of the optical fibers 10 is, for example, 10 to 40. While as one example, the number of the bare optical fibers 11 is 24, not limited to this, it can be properly changed. For example, the number of the bare optical fibers 11 may be 36.

Figure 3:
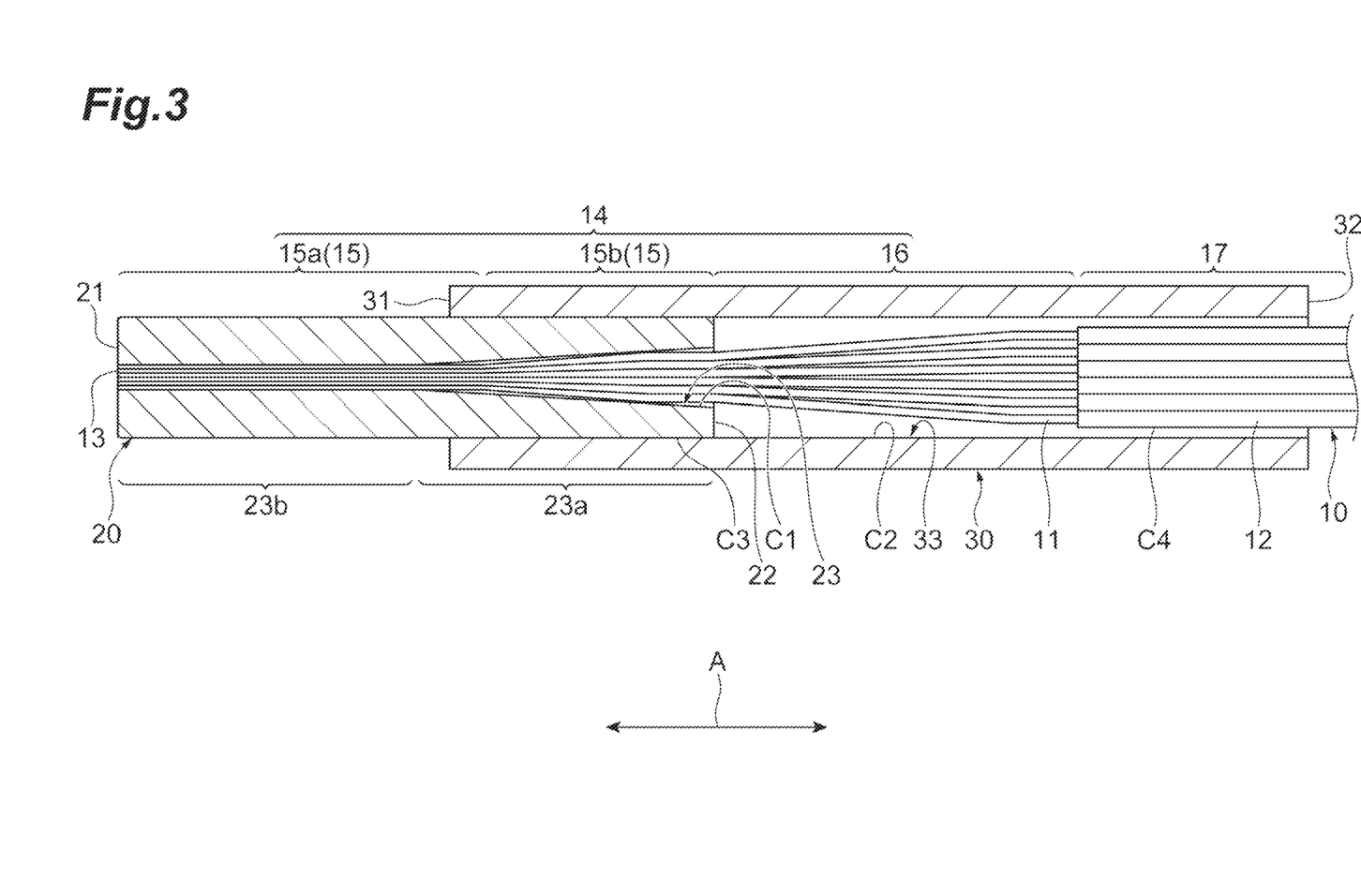
FIG. 3 is a lateral view showing a state where adhesive agents are omitted from the optical connection component shown in FIG. 2.

Herein, the configuration of the optical fibers 10 is more specifically described with reference to FIG. 3. FIG. 3 is a lateral view showing a state where the adhesive agents B1 to B3 are omitted from the optical connection component 1 shown in FIG. 2. In FIG. 3, the ferrule 20 and the tube 30 are shown as cross sections taken along the axial direction A. As shown in FIG. 3, in the optical fibers 10, coating removal portions 14 and coated fiber portions 17 are sequentially provided from tip end surfaces 13 in the axial direction A of the optical connection component 1. Each of the tip end surfaces 13 is a surface containing the tip of each optical fiber 10 in the axial direction A, and intersects (is perpendicular to, in the present embodiment) the axial direction A. The core of the bare optical fiber 11 is exposed on each tip end surface 13.

Each of the coating removal portions 14 is a portion in which the plastic coating 12 with a predetermined length from the tip end surface 13 is removed in each optical fiber 10. While the aforementioned predetermined length is a length, for example, larger than the total length of the ferrule 20 in the axial direction A, not limited to this, the length can be properly changed. In the coating removal portions 14, the claddings of the bare optical fibers 11 are exposed. Examples of a method of forming the coating removal portions 14 include a method of tearing off the plastic coatings 12 using a blade made of metal or the like. Otherwise, such examples also include a chemical method such as a method of decomposing and removing the coatings with hot concentrated sulfuric acid.

Each of the coating removal portions 14 has a first fiber portion 15 including the tip end surface 13, and a second fiber portion 16 positioned between the first fiber portion 15 and the coated fiber portion 17 in the axial direction A. The first fiber portion 15 is a portion placed and held in a fiber hole 23 of the ferrule 20, mentioned later. Each of the first fiber portions 15 has a small diameter portion 15a including the tip end surface 13, and a taper 15b positioned between the small diameter portion 15a and the second fiber portion 16 in the axial direction A. The small diameter portion 15a and the taper 15b are obtained by the cladding of each bare optical fiber 11 being made thin by a chemical method, such as chemical etching using hydrofluoric acid.

Each of the small diameter portions 15a is made thin in such a way that its outer diameter is smaller than the outer diameter of the second fiber portion 16. The outer diameter of the small diameter portion 15a is constant at positions of the small diameter portion 15a in the axial direction A, and is, for example, 60 μm. Each of the tapers 15b is made thin in such a way that its outer diameter gradually decreases as going from the second fiber portion 16 toward the small diameter portion 15a.

Each of the second fiber portions 16 is a portion communicating with the first fiber portion 15 and positioned outside the ferrule 20. The diameter of the second fiber portion 16 is constant at positions of the second fiber portion 16 in the axial direction A, and is, for example, 125 μm. Each of the coated fiber portions 17 is a portion in which the plastic coating 12 remains The diameter of the coated fiber portion 17 is larger than the outer diameter of the coating removal portion 14, and is, for example, 250 μm.

As shown in FIG. 1, the ferrule 20 is a cylindrical member with the axial direction A being as its center axis direction. The material of the ferrule 20 is, for example, glass (quartz glass or the like) having UV transparency. The material of the ferrule 20 may be glass not having UV transparency, or may be another material such as ceramics (for example, zirconia) or a metal.

As shown in FIG. 2 and FIG. 3, the ferrule 20 has a first end surface 21 and a second end surface 22 opposing each other in the axial direction A, and the fiber hole 23 extending from the first end surface 21 to the second end surface 22. The second end surface 22 faces the coated fiber portions 17 in the axial direction A, and the first end surface 21 is positioned on the opposite to the coated fiber portions 17 relative to the second end surface 22 in the axial direction A. Each of the first end surface 21 and the second end surface 22 is, for example, perpendicular to the axial direction A. On the first end surface 21, the tip end surface 13 of each optical fiber 10 is exposed. The first end surface 21 is along the tip end surfaces 13, and is exemplarily flush with the tip end surfaces 13.

The fiber hole 23 extends along the axial direction A, and exhibits a circular shape as seen from the axial direction A. As mentioned above, the fiber hole 23 places and holds the first fiber portions 15. Specifically, the adhesive agent B1 (see FIG. 2) is applied into the fiber hole 23 (which is specifically filled with it), and the first fiber portions 15 are fixed onto an inner circumferential surface C1 of the fiber hole 23 with the adhesive agent B1. The adhesive agent B1 is, for example, a UV curable adhesive agent, not limited to this. The adhesive agent B1 may be, for example, a thermosetting adhesive agent.

As shown in FIG. 3, the fiber hole 23 includes a taper 23a extending from the second end surface 22 toward the first end surface 21, and a straight 23b extending from the taper 23a toward the first end surface 21. The inner diameter of the taper 23a gradually decreases as going from the second end surface 22 toward the first end surface 21. Accordingly, the inner diameter of the taper 23a at one end closer to the first end surface 21 is smaller than the inner diameter of the taper 23a on the second end surface 22. The taper 23a places the tapers 15b of the first fiber portions 15, and parts of the small diameter portions 15a, adjacent to the tapers 15b.

The inner diameter of the straight 23b is constant at positions of the straight 23b in the axial direction A, and is the same as the inner diameter of the taper 23a at the one end closer to the first end surface 21. The straight 23b places the remainders of the small diameter portions 15a. The inner diameter of the straight 23b is slightly larger than the diameter of the circumscribed circle including the first fiber portions 15 as seen from the axial direction A.

In the straight 23b, the first fiber portions 15 are held into a predetermined arrangement. Specifically, in the straight 23b, the first fiber portions 15 are arranged in such a way that the diameter of the aforementioned circumscribed circle is at its minimum as seen from the axial direction A, and the first fiber portions 15 adjacent to one another are arranged at substantially the same intervals. In the present embodiment, for the first fiber portions 15, four bare optical fiber rows each of which consists of six bare optical fibers 11 arranged at the same intervals along a direction perpendicular to the axial direction A are arranged at the same intervals along a direction perpendicular to the relevant direction and the axial direction A. The arrangement of the bare optical fibers 11 may be at intervals not the same as one another, and they are not necessarily in the arranged state.

As shown in FIG. 1, the tube 30 is a cylindrical member with the axial direction A being as its center axis direction. The material of the tube 30 is, for example, the same material as that of the ferrule 20. Namely, the material of the tube 30 is, for example, glass having UV transparency (quartz glass or the like). The material of the tube 30 may be glass not having UV transparency, or may be another material such as ceramics (for example, zirconia) or a metal. As the material of the tube 30, a material having the same coefficient of linear expansion as the coefficient of linear expansion of the ferrule 20 is suitable.

As shown in FIG. 2 and FIG. 3, the tube 30 has a first end surface 31 and a second end surface 32 opposing each other in the axial direction A, and a containing hole 33 extending from the first end surface 31 to the second end surface 32. The first end surface 31 contains the ferrule 20, and the second end surface 32 contains the coated fiber portions 17. Each of the first end surface 31 and the second end surface 32 is, for example, perpendicular to the axial direction A.

The containing hole 33 extends along the axial direction A, and communicates with the fiber hole 23 of the ferrule 20. The inner diameter of the containing hole 33 exhibits a circular shape as seen from the axial direction A, and is larger than the inner diameter of the fiber hole 23. The inner diameter of the containing hole 33 is constant at positions of the containing hole 33 in the axial direction A, and is slightly larger than the outer diameter of the ferrule 20.

The containing hole 33 places a portion of the ferrule 20 closer to the second end surface 22 and the first fiber portions 15 held in the portion, the second fiber portions 16, and parts of the coated fiber portions 17 adjacent to the second fiber portions 16. An adhesive agent is not applied to a region R in which the second fiber portions 16 are placed in the containing hole 33. Therefore, the region R of the containing hole 33 is not filled with an adhesive agent, and a void (that is region R) is provided between the second fiber portions 16 and an inner circumferential surface C2 of the containing hole 33.

Meanwhile, the adhesive agent B3 (see FIG. 2) is applied onto an outer circumferential surface C3 in a part of the ferrule 20 closer to the second end surface 22, and the outer circumferential surface C3 is fixed onto the inner circumferential surface C2 of the containing hole 33 with the adhesive agent B3. Thereby, relative movement of the ferrule 20 and the first fiber portions 15 held in the ferrule 20 relative to the tube 30 in the axial direction A is restricted. The adhesive agent B2 (see FIG. 2) is applied onto an outer circumferential surface C4 in parts of the coated fiber portions 17 adjacent to the second fiber portions 16, and the outer circumferential surface C4 is fixed onto the inner circumferential surface C2 with the adhesive agent B2. Thereby, relative movement of the coated fiber portions 17 relative to the tube 30 in the axial direction A is restricted.

As above, each of the first fiber portions 15 and each of the coated fiber portions 17 are restricted from relative movement to the tube 30 in the axial direction A. Thereby, even when the coated fiber portions 17 are pulled in the axial direction A, tensile stress can be suppressed from being loaded to the second fiber portions 16 between the first fiber portions 15 and the coated fiber portions 17, and occurrence of breakage of the second fiber portions 16 and displacement thereof can be prevented. While the material of each of the adhesive agent B2 and adhesive agent B3 is, for example, the same as the material of the adhesive agent B1, it may be different from the material of the adhesive agent B1.

Figure 4:
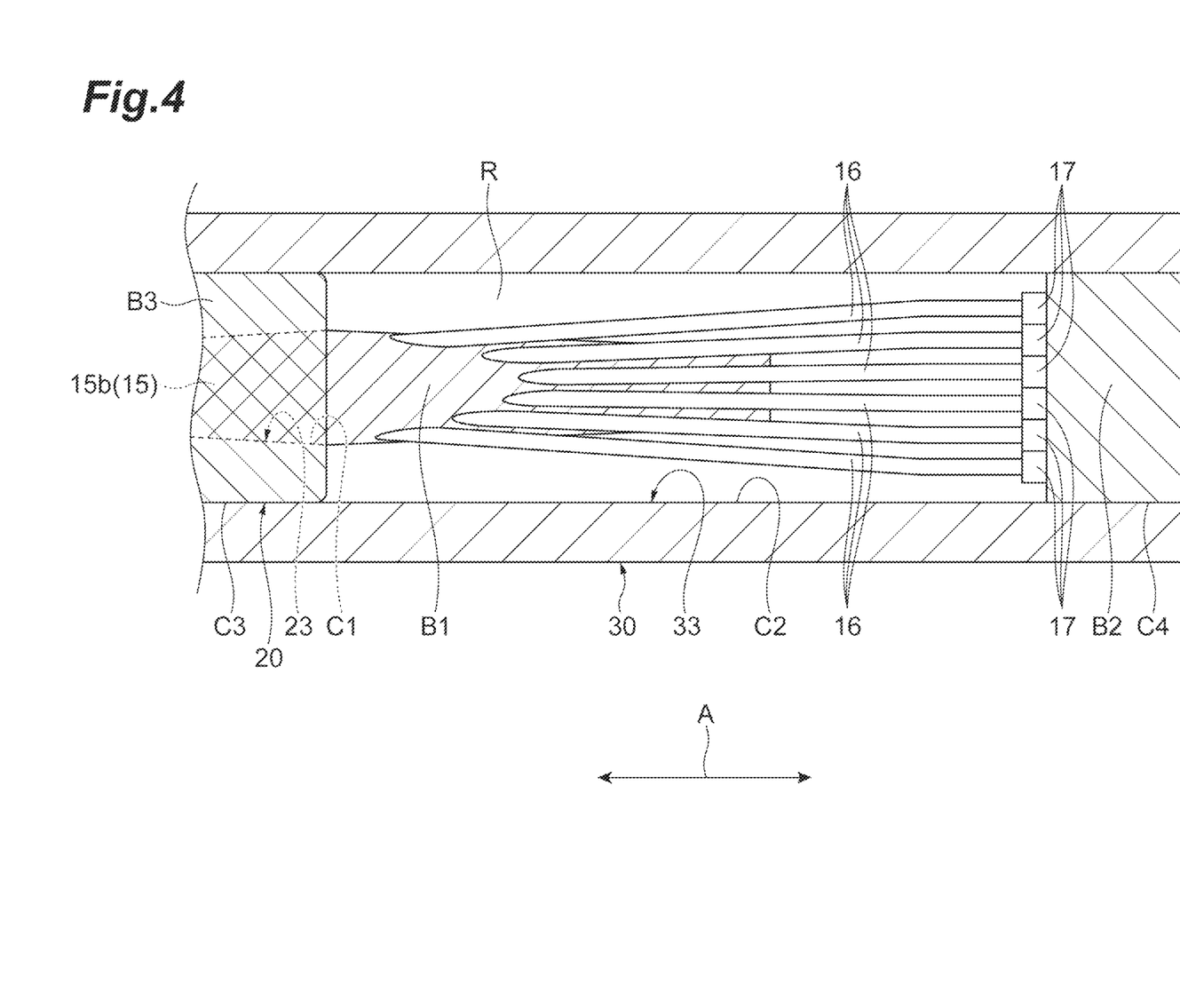
FIG. 4 is an expanded view showing the vicinity of second fiber portions of the optical connection component shown in FIG. 2.

Herein, the configurations of the adhesive agents B1 to B3 are more specifically described with reference to FIG. 4. FIG. 4 is an expanded view showing the vicinity of the second fiber portions 16 of the optical connection component 1 shown in FIG. 2. As shown in FIG. 4, the adhesive agent B1 applied into the fiber hole 23 exudes into the containing hole 33 communicating with the fiber hole 23 by capillarity. Namely, the adhesive agent B1 extends along the second fiber portions 16 from the fiber hole 23 to the containing hole 33 in the axial direction A. In the containing hole 33, the adhesive agent B1 is separate from the coated fiber portions 17 in the axial direction A. Furthermore, the adhesive agent B1 is separate from the inner circumferential surface C2 of the containing hole 33 in directions perpendicular to the axial direction A. Therefore, a void (that is region R) is formed between the inner circumferential surface C2 of the containing hole 33 and the adhesive agent B1 extending along the second fiber portions 16. The adhesive agent B3 applied onto the outer circumferential surface C3 of the ferrule 20 does not contact with the second fiber portions 16, and the adhesive agent B2 applied onto the outer circumferential surface C4 of the coated fiber portions 17 does not contact with the second fiber portions 16.

The optical connection component 1 including the aforementioned configuration has a region in which an adhesive agent is applied and a region in which an adhesive agent is not applied. The region in which an adhesive agent is applied includes the region placing the part of the ferrule 20 closer to the second end surface 22, and the region placing the parts of the coated fiber portions 17 adjacent to the second fiber portions 16. Meanwhile, the region in which an adhesive agent is not applied is the region R placing the second fiber portions 16 in the containing hole 33.

Herein, a fiber filling rate of the optical fibers 10 in the region in which an adhesive agent is not applied is described. The fiber filling rate is defined as a ratio of the total sectional area of the plurality of optical fibers 10 relative to the sectional area inside the optical connection component 1 in a cross section perpendicular to the axial direction A of the optical connection component 1. In the optical connection component 1 according to the present embodiment, the region small in this fiber filling rate (that is, large in void rate) is set not to be filled with an adhesive agent. For example, 30% can be set as the upper limit of such a fiber filling rate, and a void with less than 30% of fiber filling rate can be set not to be filled with an adhesive agent. If a region larger than a region occupied by the optical fibers 10 in the internal region in the optical connection component 1 is filled with an adhesive agent, there comes a possibility that the adhesive agent expands through thermal expansion or the like and this affects the optical fibers 10 (in particular, the coating removal portions 14, from which the plastic coatings 12 are removed). For preventing it, as mentioned above, the region small in this fiber filling rate is set not to be filled with an adhesive agent.

For example, when in the present embodiment, the number of the optical fibers 10 is 24, the fiber filling rate in the cross section passing through the second fiber portions 16 out of cross sections perpendicular to the axial direction A of the optical connection component 1 (that is, a ratio of the total sectional area of the second fiber portions 16 relative to the sectional area inside the containing hole 33) is 12%, an adhesive agent is set not to be applied into the region R in which the second fiber portions 16 are placed in the containing hole 33. While the fiber hole 23 is filled with an adhesive agent in the region in which the first fiber portions 15 are placed in the ferrule 20, since the fiber filling rate is 40% to 80% (that is, the void rate is low), the influence is small.

Likewise, when the number of the optical fibers 10 is 36, the fiber filling rate in the cross section passing through the second fiber portions 16 out of cross sections perpendicular to the axial direction A of the optical connection component 1 (that is, the ratio of the total sectional area of the second fiber portions 16 relative to the sectional area inside the containing hole 33) is 17%, and an adhesive agent is set not to be applied into the region R in which the second fiber portions 16 are placed in the containing hole 33. Also in this example, while the fiber hole 23 is filled with an adhesive agent in the region in which the first fiber portions 15 are placed in the ferrule 20, since the fiber filling rate is 50% to 80% (that is, the void rate is low), the influence is small.

Figure 5:
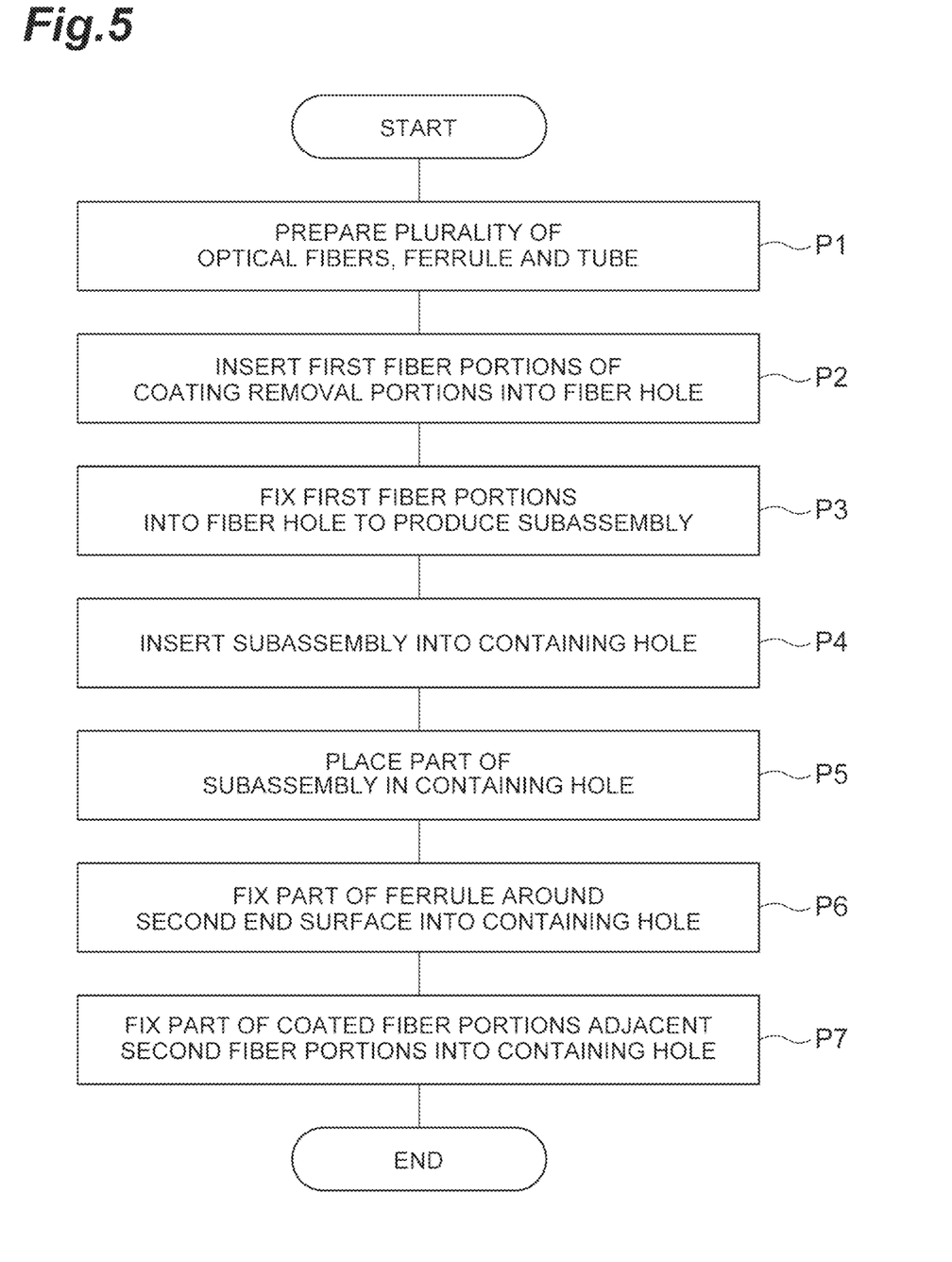
FIG. 5 is a flowchart exemplarily showing a method of manufacturing the optical connection component.
Figure 6A:
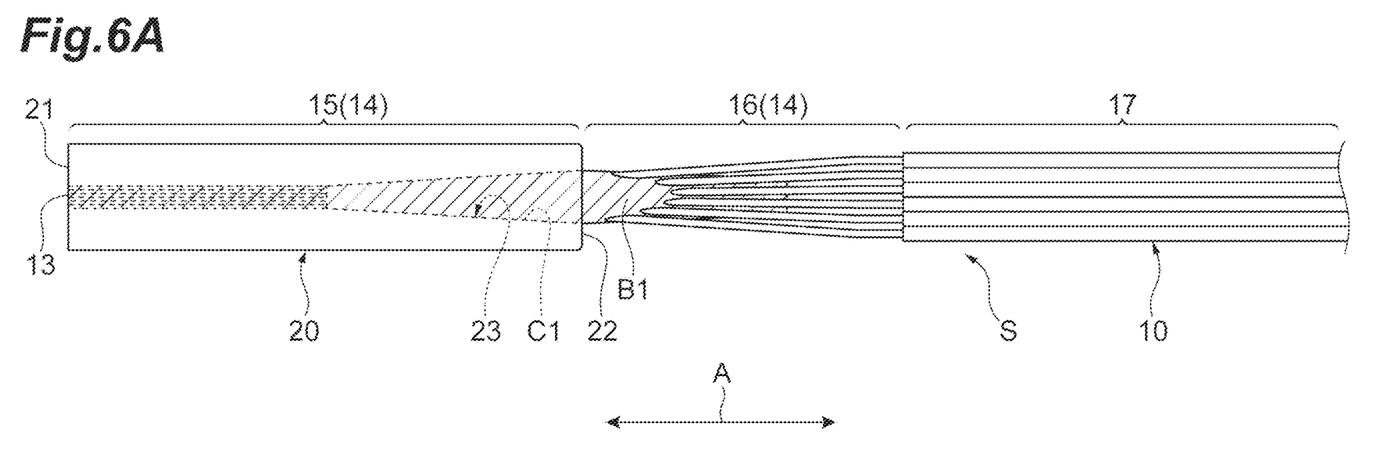
FIG. 6A and FIG. 6B are lateral views exemplarily showing manufacturing steps of the optical connection component.
Figure 6B:
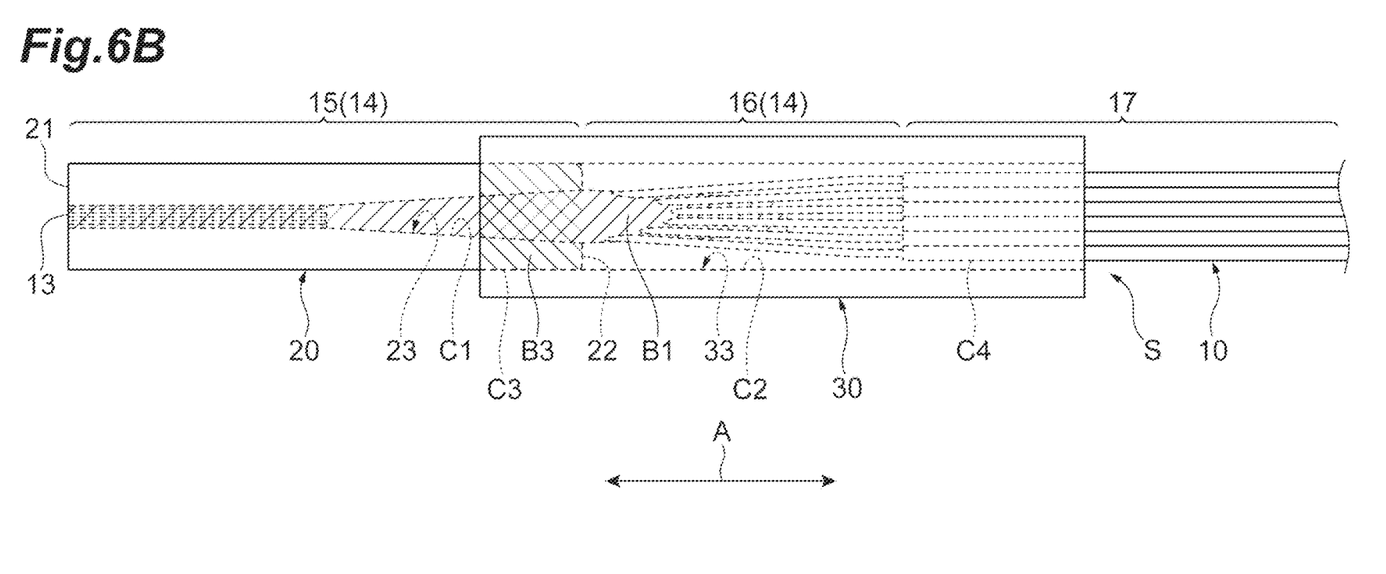

Next, a manufacturing method of the optical connection component 1 is described with reference to FIG. 5, FIG. 6A and FIG. 6B. FIG. 5 is a flowchart exemplarily showing a manufacturing method of the optical connection component 1. FIG. 6A and FIG. 6B are diagrams exemplarily showing manufacturing steps of the optical connection component 1.

First, the plurality of optical fibers 10, the ferrule 20 and the tube 30 are prepared (step P1). When the plurality of optical fibers 10 are prepared, a plurality of optical fibers in which the plastic coatings 12 are not removed are prepared, and then the coated fibers are formed in which the coating removal portions 14 and the coated fiber portions 17 are sequentially provided by removing the plastic coatings 12 with a predetermined length from their tips. After that, the coating removal portions 14 are made thin by etching the outer circumferential portions thereof closer to their tips by a chemical method to form the first fiber portions 15 including the small diameter portions 15a and the tapers 15b, and the second fiber portions 16 still having the normal diameters.

Next, as shown in FIG. 6A, the adhesive agent B1 is applied into the fiber hole 23 of the ferrule 20, and the first fiber portions 15 of the coating removal portions 14 of the plurality of optical fibers 10 are inserted into the fiber hole 23 (step P2). In this stage, the small diameter portions 15a of the first fiber portions 15 are inserted into the fiber hole 23 of the ferrule 20 from the second end surface 22 (see FIG. 3). The small diameter portions 15a inserted into the fiber hole 23 are guided by the taper 23a into the straight 23b to be placed in the straight 23b. The tapers 15b of the first fiber portions 15 are placed in the taper 23a.

Next, by fixing the first fiber portions 15 to the fiber hole 23 with the adhesive agent B1, a subassembly S in which the plurality of optical fibers 10 are fixed to the ferrule 20 is produced (step P3). Next, as shown in FIG. 6B, the ferrule 20 of the produced subassembly S is inserted into the containing hole 33 of the tube 30 from a tip of the ferrule 20 (step P4). After that, a part of the ferrule 20 closer to the second end surface 22 and the first fiber portions 15 held in the part, the second fiber portions 16, and a portion of the coated fiber portions 17 adjacent to the second fiber portion 16 are placed in the containing hole 33 (step P5). Subsequently, the adhesive agent B3 is applied between the outer circumferential surface C3 of the ferrule 20 and the inner circumferential surface C2 of the containing hole 33 to fix the outer circumferential surface C3 to the inner circumferential surface C2 with the adhesive agent B3 (step P6). In this stage, there comes the state where the gap between the outer circumferential surface C3 and the inner circumferential surface C2 is sealed with the adhesive agent B3.

Next, the adhesive agent B2 (see FIG. 2) is applied between the outer circumferential surface C4 of the coated fiber portions 17 and the inner circumferential surface C2 to fix the outer circumferential surface C4 to the inner circumferential surface C2 with the adhesive agent B2 (step P7). When the adhesive agent B2 is applied, the gap between the outer circumferential surface C3 and the inner circumferential surface C2 is sealed with the adhesive agent B3. Therefore, the adhesive agent B3 is prevented from exuding into the region R due to the air confined in the region R in which the second fiber portions 16 are placed in the containing hole 33. Thereby, it can be prevented that the adhesive agent B3 fills or flows into the region R. Through the aforementioned steps, the optical connection component 1 shown in FIG. 1 and FIG. 2 is obtained.

Next, advantageous effects attained by the optical connection component 1 are described. In the optical connection component 1 according to the present embodiment, since the inner diameter of the containing hole 33 of the tube 30 is larger than the inner diameter of the fiber hole 23 of the ferrule 20, a gap between the inner circumferential surface C2 of the containing hole 33 and the second fiber portions 16 is larger than a gap between the inner circumferential surface C1 of the fiber hole 23 and the first fiber portions 15, and more adhesive agent is able to be placed in the region R in which the second fiber portions 16 are placed in the containing hole 33. Nevertheless, in the optical connection component 1 according to the present embodiment, since the region R of the containing hole 33 is not filled with an adhesive agent and a void (that is region R) is provided between the second fiber portions 16 and the inner circumferential surface C2 of the containing hole 33, the volumes of the adhesive agents B1 to B3 inside the containing hole 33 can be reduced. Furthermore, by providing this void, a space with which volume changes of the adhesive agents B1 to B3 are allowed in the containing hole 33 can be secured. Therefore, even when large volume changes occur in the adhesive agents B1 to B3 due to thermal expansion or the like, large stress occurring due to the large volume changes can be buffered by displacements of the adhesive agents B1 to B3. Thereby, stress on the second fiber portions 16 due to the volume changes of the adhesive agents B1 to B3 can be reduced, and disadvantages such as occurrence of deterioration of optical transmission characteristics due to micro-bending or breakage in the bare optical fibers 11 can be prevented. As a result, reliability of the bare optical fibers 11 can be enhanced. According to the aforementioned manufacturing method, the adhesive agent can be more securely prevented from infiltrating into the containing hole 33, and the optical connection component 1 attaining the aforementioned effects can be more securely manufactured.

The coated fiber portions 17 are fixed, with the adhesive agent B2, onto the inner circumferential surface C2 of the containing hole 33 around the second end surface 32 opposite to the first end surface 31 on which the ferrule 20 is held. Thereby, even when bending or tensile stress, or the like is exerted on the coated fiber portions 17, for example, such stress can be prevented from being concentrated on the second fiber portions 16, from which the plastic coatings 12 are removed.

The adhesive agent B2 does not contact with the coating removal portions 14 in the containing hole 33. The adhesive agent B2 is prevented, as above, from being provided across the second fiber portions 16 from the inner circumferential surface C2 of the containing hole 33 along the edge of the coated fiber portions 17. Thereby, the configuration in which the void is provided between the inner circumferential surface C2 of the containing hole 33 and the second fiber portions 16 can be more securely realized. Furthermore, since the adhesive agent B2 does not contact with the coating removal portions 14, the coating removal portions 14 and the plastic coatings 12 are not fixed to each other with the adhesive agent B2. In this case, since each bare optical fiber 11 can slightly move inside the plastic coating 12, even when stress on the second fiber portions 16 exists, such stress can be buffered by a displacement of each bare optical fiber 11 relative to the plastic coating 12. Thereby, stress on the second fiber portions 16 can be further effectively reduced.

The material of the adhesive agent B1 is the same as the material of the second adhesive agent B2. By using the adhesive agents of the same materials as above, the optical connection component 1 can be easily manufactured.

The outer circumferential surface C3 of the ferrule 20 is fixed onto the inner circumferential surface C2 of the containing hole 33 around the first end surface 31 of the tube 30 with the adhesive agent B3. Thereby, even when bending stress or the like is exerted on the coated fiber portions 17, for example, such stress can be prevented from being concentrated on the second fiber portions 16.

The adhesive agent B1 is separate from the coated fiber portions 17 in the containing hole 33. Thereby, the adhesive agent B1 can be prevented from being provided across the inner circumferential surface C2 of the containing hole 33 from the second fiber portions 16 along the edge of the coated fiber portions 17. Namely, it can be more securely realized that the void is provided between the inner circumferential surface C2 of the containing hole 33 and the second fiber portions 16.

The ferrule 20 and the tube 30 are respectively composed of glass. Thereby, UV curable resin can be used as materials of the adhesive agents B1 to B3, the adhesive agents B1 to B3 can be cured by irradiating the adhesive agents B1 to B3 with UV light through the glass. Thereby, the optical connection component 1 can be easily manufactured. Furthermore, when the ferrule 20 and the tube 30 are composed of glass, it can be easily confirmed that the containing hole 33 of the tube 30 is not filled with the adhesive agent.

The coefficient of linear expansion of the ferrule 20 can be the same as the coefficient of liner expansion of the tube 30. Thereby, even when volume changes (for example, expansion or shrinkage) occur in the ferrule 20 and the tube 30 due to a temperature change, the tube 30 can be allowed to deform to meet the deformation of the ferrule 20. Thereby, the ferrule 20 and the tube 30 can be prevented from being damaged due to the deformations by the temperature change.

The first fiber portions 15 include the small diameter portions 15a with outer diameters made smaller than outer diameters of the second fiber portions 16. Thereby, the tips of the optical fibers 10 can be arranged in high density, and the number of optical fibers 10 can be increased. As a result, optical network flexibility can be increased.

The fiber hole 23 is provided with the taper 23a extending from the second end surface 22 toward the first end surface 21, and the straight 23b extending from the taper 23a toward the first end surface 21. The inner diameter of the taper 23a gradually decreases towards the first end surface 21, and the inner diameter of the straight 23b is constant. Thereby, when the first fiber portions 15 are inserted into the fiber hole 23 of the ferrule 20 in manufacturing of the optical connection component 1, the first fiber portions 15 are guided by the taper 23a to be inserted into the straight 23b. Thereby, the first fiber portions 15 can be easily inserted into the fiber hole 23. Furthermore, since the insertion is performed through the tapered portion, the tips of the optical fibers 10 or the like can be prevented from being damaged during the insertion.

The tip end surfaces 13 of the plurality of optical fibers 10 are flush with the first end surface 21 of the ferrule 20 at the first end surface 21 thereof. Thereby when the optical connection component 1 is abutted against its counterpart connection component to connect it, the connection can be accurately performed.

The fiber filling rate of containing hole 33 is less than 30%. The fiber filling rate is a ratio of a total sectional area of the plurality of optical fibers 10 relative to the sectional area inside the containing hole 33 in a cross section passing through the second fiber portions 16 out of cross sections perpendicular to the axial direction A. Thereby, while more adhesive agent can be placed in the region R in which the second fiber portions 16 are placed in the containing hole 33, it is not filled with an adhesive agent according to the aforementioned configuration, disadvantages such as occurrence of deterioration of optical transmission characteristics due to optical fiber micro-bending or breakage can be prevented. As a result, reliability of the bare optical fibers 11 can be enhanced.

The optical connection component and the manufacturing method of the optical connection component according to the present invention are not limited to the aforementioned embodiments but various other modifications are possible. For example, while in the aforementioned embodiments, each of the ferrule 20 and the tube 30 exhibits a cylindrical shape, not limited to this. Each of the ferrule and the tube may exhibit another shape such, for example, as a quadrangular cylindrical shape. In the aforementioned embodiments, the tube 30 and the ferrule 20 are described as separate members. However, the tube and the ferrule may be one member integrally formed. In the aforementioned embodiments, the ferrule 20 is fixed to the tube 30 with the adhesive agent B2. However, the ferrule may be fixed to the tube by another fixing method (for example, with screw shapes).

The first fiber portions do not necessarily include the small diameter portions 15a and the tapers 15b but may have the same diameter as that of the second fiber portions 16. The containing hole does not necessarily have the taper 23a and the straight 23b but may be formed to have a constant inner diameter from the first end surface 21 to the second end surface 22. The inner diameter of the containing hole of the tube is not necessarily constant but may change at positions thereof in the axial direction A.

What is claimed is:

1. An optical connection component comprising:
a plurality of optical fibers each having a bare optical fiber and a plastic coating that surrounds the bare optical fiber, the plurality of optical fibers being provided with coating removal portions in which the plastic coatings are removed from respective tips of the plurality of optical fibers so as to expose the bare optical fibers, and coated fiber portions in which the plastic coatings respectively surround the bare optical fibers, wherein the coating removal portions and the coated fiber portions are sequentially placed along an axial direction of the optical connection component from the tips;
a ferrule having a first inner hole extending from a first end adjacent to the tips to a second end opposite to the first end, the ferrule holding tip parts of the coating removal portions in the first inner hole; and
a tube having a second inner hole larger in inner diameter than the first inner hole, the tube being configured to protect the coating removal portions placed within the second inner hole,
wherein the coating removal portions includes first fiber portions held by the first inner hole of the ferrule and second fiber portions positioned between the first fiber portions and the coated fiber portions along the axial direction,
wherein the tube places, in the second inner hole, a part of the ferrule closer to the second end, the first fiber portions held by the part of the ferrule, the second fiber portions, and a part of the coated fiber portions adjacent to the second fiber portions, and
wherein the first fiber portions are fixed onto an inner circumferential surface of the first inner hole with a first adhesive agent, and a region, in which the second fiber portions are placed in the second inner hole, is not filled with an adhesive agent, and a void is provided between the second fiber portions and an inner circumferential surface of the second inner hole.

2. The optical connection component according to claim 1, wherein the coated fiber portions are fixed, with a second adhesive agent, onto the inner circumferential surface of the second inner hole around a second end, of the tube, opposite to a first end thereof on which the ferrule is held.

3. The optical connection component according to claim 2, wherein the second adhesive agent does not contact with the coating removal portions in the second inner hole.

4. The optical connection component according to claim 2, wherein a material of the first adhesive agent is the same as a material of the second adhesive agent.

5. The optical connection component according to claim 1, wherein an outer circumferential surface of the ferrule around the second end thereof is fixed onto the inner circumferential surface of the second inner hole around a first end, of the tube, closer to the tips with a third adhesive agent.

6. The optical connection component according to claim 1, wherein the first adhesive agent is separate from the coated fiber portions in the second inner hole.

7. The optical connection component according to claim 1, wherein the ferrule and the tube are respectively composed of glass.

8. The optical connection component according to claim 1, wherein the coefficient of linear expansion of the ferrule is the same as the coefficient of liner expansion of the tube.

9. The optical connection component according to claim 1, wherein the first fiber portions include small diameter portions with outer diameters made smaller than outer diameters of the second fiber portions.

10. The optical connection component according to claim 9, wherein the outer diameters of the small diameter portions are less than fifty-five percent of the outer diameters of the second fiber portions.

11. The optical connection component according to claim 1, wherein the first inner hole is provided with a taper extending from the second end toward the first end, and a straight extending from the taper toward the first end, an inner diameter of the taper gradually decreasing towards the first end, an inner diameter of the straight being constant.

12. The optical connection component according to claim 1, wherein tip end surfaces of the plurality of optical fibers is flush with an end surface of the ferrule at the first end thereof.

13. The optical connection component according to claim 1, wherein a first fiber filling rate of the first inner hole is between 40% and 80%, wherein the first fiber filling rate is a ratio of a total sectional area of the plurality of optical fibers relative to a sectional area inside the first inner hole in a cross section passing through the first fiber portions out of cross sections perpendicular to the axial direction.

14. The optical connection component according to claim 1, wherein a second fiber filling rate of the second inner hole is less than 30%, wherein the second fiber filling rate is a ratio of a total sectional area of the plurality of optical fibers relative to a sectional area inside the second inner hole in a cross section passing through the second fiber portions out of cross sections perpendicular to the axial direction.

15. The optical connection component according to claim 14, wherein the second fiber filling rate is less than 15%.

16. The optical connection component according to claim 1, wherein a second fiber filling rate of the tube is smaller than a first fiber filling rate of the ferrule, wherein the first fiber filling rate is a ratio of a total sectional area of the plurality of optical fibers relative to a sectional area inside the first inner hole in a cross section passing through the first fiber portions out of cross sections perpendicular to the axial direction, and the second fiber filling rate is a ratio of a total sectional area of the plurality of optical fibers relative to a sectional area inside the second inner hole in a cross section passing through the second fiber portions out of cross sections perpendicular to the axial direction.

17. The optical connection component according to claim 1, wherein respective lengths of the coating removal portions are longer than a total length of the ferrule along the axial direction.

18. The optical connection component according to claim 1, wherein each of the ferrule and the tube includes a cylindrical member.

19. The optical connection component according to claim 1, wherein a number of the optical fibers is between 10 and 40.

20. A method of manufacturing an optical connection component, comprising:

preparing a plurality of optical fibers each having an bare optical fiber and a plastic coating that surrounds the bare optical fiber;

preparing a ferrule having a first inner hole extending from a first end to a second end;

preparing a tube having a second inner hole extending from a first end to a second end, the second inner hole being larger in inner diameter than the ferrule in outer diameter;

removing tip parts of the plastic coatings of the plurality of optical fibers to provide coating removal portions in which the plastic coatings are removed from respective tips of the plurality of optical fibers so as to expose the bare optical fibers, and coated fiber portions in which the plastic coatings respectively surround the bare optical fibers;

inserting the plurality of optical fibers into the first inner hole of the ferrule such that first fiber portions of the coating removal portions near the tips is placed in the first inner hole, and bonding the first fiber portions to the first inner hole to produce a subassembly; and inserting the ferrule of the subassembly into the second inner hole from its tip to place, in the second inner hole, a part of the ferrule closer to the second end, the first fiber portions held by the part of the ferrule, second fiber portions, of the coating removal portions, being in series with the first fiber portions and positioned outside the ferrule, and a part of the coated fiber portions adjacent to the second fiber portions, wherein a region, in which the second fiber portions are placed in the second inner hole, is not filled with an adhesive agent, and a void is provided between the second fiber portions and an inner circumferential surface of the second inner hole.

* * * * *